United States Patent
Delgado (10) Patent No.: US 9,579,834 B2
(45) Date of Patent: Feb. 28, 2017

(54) PURIFICATION APPARATUS, SYSTEM, AND METHOD

(71) Applicant: Pedro Tomas Delgado, Boulder, CO (US)

(72) Inventor: Pedro Tomas Delgado, Boulder, CO (US)

(*) Notice: Subject to any disclaimer, the term of this patent is extended or adjusted under 35 U.S.C. 154(b) by 92 days.

(21) Appl. No.: 14/295,263

(22) Filed: Jun. 3, 2014

(65) Prior Publication Data

US 2014/0353227 A1 Dec. 4, 2014

Related U.S. Application Data

(60) Provisional application No. 61/830,623, filed on Jun. 3, 2013.

(51) Int. Cl.

| | |
|---|---|
| *C02F 3/32* | (2006.01) |
| *A01G 31/02* | (2006.01) |
| *B29C 45/00* | (2006.01) |
| *A01G 9/00* | (2006.01) |
| *C02F 3/10* | (2006.01) |
| *B29K 23/00* | (2006.01) |
| *B29L 12/00* | (2006.01) |
| *B29L 31/00* | (2006.01) |

(52) U.S. Cl.
CPC ............... *B29C 45/00* (2013.01); *A01G 9/00* (2013.01); *A01G 31/02* (2013.01); *C02F 3/101* (2013.01); *C02F 3/32* (2013.01); *B29K 2023/0633* (2013.01); *B29K 2023/12* (2013.01); *B29K 2995/006* (2013.01); *B29K 2995/0056* (2013.01); *B29K 2995/0097* (2013.01); *B29L 2012/00* (2013.01); *B29L 2031/7004* (2013.01); *Y02W 10/15* (2015.05)

(58) Field of Classification Search
CPC . C02F 3/101; C02F 3/32; C02F 3/327; A01G 9/00; A01G 31/00; A01G 31/02; A01G 31/06; B29L 2031/7004
USPC ........ 210/170.05, 170.09, 170.1, 242.1, 602; 47/59 R, 63, 65.7, 66.1, 66.5, 86
See application file for complete search history.

(56) References Cited

U.S. PATENT DOCUMENTS

| | | | |
|---|---|---|---|
| 4,037,360 A | 7/1977 | Farnsworth | |
| 4,513,533 A | 4/1985 | Gething et al. | |
| 4,622,775 A * | 11/1986 | Glenn | A01G 31/02 47/63 |
| 4,976,064 A * | 12/1990 | Julien | A01G 31/02 47/59 R |
| 5,337,516 A | 8/1994 | Hondulas | |
| 6,751,903 B2 | 6/2004 | Shryock | |
| 6,843,021 B1 | 1/2005 | Huang | |

(Continued)

FOREIGN PATENT DOCUMENTS

WO WO 96/35326 * 11/1996

*Primary Examiner* — Christopher Upton
(74) *Attorney, Agent, or Firm* — William Hunziker (57) ABSTRACT

A water purification apparatus comprising an injection molded floating non-toxic, biodegradable, and recyclable polymer planar structures that are easily stackable, shippable, and connectable to as many companion units as the user desires; such apparatus further comprising many receiving structures made to accommodate plants without inhibiting them so that the user may create a film of plants over a toxic body of liquid for bioremediation purposes.

10 Claims, 6 Drawing Sheets

(56) References Cited

U.S. PATENT DOCUMENTS

| | | | |
|---|---|---|---|
| 2007/0137100 A1* | 6/2007 | Beeman | A01G 9/00 47/59 R |
| 2007/0209278 A1* | 9/2007 | Becker | A01G 9/00 47/59 R |
| 2012/0006743 A1* | 1/2012 | Streb | A01G 9/00 210/170.05 |
| 2012/0012516 A1 | 1/2012 | Junco et al. | |
| 2014/0151293 A1* | 6/2014 | Curry | C02F 3/327 210/602 |
| 2014/0202954 A1* | 7/2014 | Lassovsky | C02F 3/327 210/602 |
| 2015/0041376 A1* | 2/2015 | Fulford | C02F 3/327 210/194 |

* cited by examiner

PURIFICATION APPARATUS, SYSTEM, AND METHOD

CROSS-REFERENCE TO RELATED APPLICATION

The document is a non-provisional patent application claiming priority to, and the benefit of, U.S. Provisional Patent Application Ser. No. 61/830,623; filed Jun. 3, 2013, also entitled "Purification Apparatus, System, and Method", and U.S. patent application Ser. No. 14/295,263; filed Jun. 3, 2014; yet again, also entitled "Purification Apparatus, System, and Method" which claim priority to the provisional already mention and which are both herein incorporated by reference in their entirety for all purposes.

TECHNICAL FIELD

The present disclosure relates to "green" or "eco-friendly" (ecologically-friendly) technologies for purifying water. More specifically, the present disclosure relates to green technologies for purifying water in the field. Even more specifically, the present disclosure relates to green technologies for purifying surface water in the field.

BACKGROUND

Many related art technologies are currently utilized for purifying water. One of the greatest challenges facing humankind is the ability to treat, purify, and render water usable and/or potable in many distinct and different regions of the globe. Increasingly, these challenges are addressed by methods of treating water with biological materials, such as plant materials, that may involve natural and organic processes to accomplish this objective. These methods often require specialized tools, such as "laminae," laminate, or laminated mats, to insure that the biological materials, such as plant materials, therein grow as well as thrive. Additionally, the laminae mat insures that the roots and other "active" parts of a plant or other biological material, being used in organic processes, are applied to the water source in a manner such that the filtration occurs with maximum efficiency. Related art laminae mats or other floating "tools" that are not homogeneous, e.g., having differing characteristics, result in less optimal growth and inefficient filtration. These challenges in the related art are exacerbated by the absence of adequate tools for applying such biological approaches to water filtration.

For example, many of the laminae mats available in the market today involve three elements: the supports, the cup positioners, and the receiving cups. These three elements often have different measurements and characteristics and are, therefore, separately fabricated, thereby requiring additional assembly during manufacturing, and thereby adding both cost and complexity to the process. Also, related art technologies require various connections to be made between a plethora of elements, thereby compromising structural integrity and adding undue complexity. Furthermore, many of these related art assemblies involve the use of undue amounts of material in their manufacture, thereby rendering these related art assemblies overly heavy, overly voluminous, and overly expensive, especially in relation to large-scale operation markets where these related art assemblies are cost-prohibitive. Finally, many of the related art assemblies that are currently available have noncompliant dimensions in relation to standard shipping sizes, e.g., standard shipping sizes that are outlined by the European Union for pallets, thereby rendering packaging and shipping an inefficient and expensive operation.

While these background examples may relate to water purification technologies in general, they fail to disclose a simple, modular, low density structure, having evenly distributed substructures for which macrophyte plants are disposable in order to permit adequate growth, that can be sequentially fabricated without leaving any gaps or uncovered areas. As such, a long-felt need has been experienced in the related art for a large-scale "organic" laminae mat, adaptable for floating on a surface of water to be treated and/or purified, wherein the large-scale "organic" laminae mat is an integrated structure, having sufficient structural integrity, is compliant with standard packaging and shipping guidelines, is both manufacturable and distributable at a low cost.

SUMMARY

In addressing many of the problems experienced in the related art, such as those relating to conventional laminae mats, the present disclosure generally involves an purification apparatus as well as its corresponding purification system and methods of fabrication and use, comprising a planar structure, such as a "mat" or "tool," e.g., a laminae mat, a large-scale "organic" laminae mat, a microbial mat, or a floating "tool," adaptable for floating on a surface of water to be treated and/or purified, wherein the large-scale "organic" laminae mat is an integrated structure, having sufficient structural integrity, is compliant with standard packaging and shipping guidelines, is both manufacturable and distributable at a low cost.

The present disclosure further involves a purification apparatus, comprising a planar structure, wherein the planar structure is disposable on a surface of a fluid body, e.g., a water body, and wherein the planar structure is homogeneous, e.g., the characteristics of the planar structure, as fully extended over the water surface, are homogeneous. In order to float well, the present disclosure contemplates a planar structure comprising materials, having a density in a range that is less than that of a given fluid, e.g., water, salt water, or fresh water, such that, even when plant or other biological material is added to the planar structure, the planar structure does not sink, but remains fully buoyant.

Preferably, since bodies of water differ in size and shape, e.g., in plan-form area, the present disclosure further contemplates a planar structure that is conducive for fabrication in a variety of corresponding sizes and shapes. To achieve this flexibility in fabrication, the planar structure comprises a plurality of subunits, whereby configuration of the final size and/or shape of the planar structure, as circumscribed by the needs of a given intervention or purification plan, is sufficiently flexible.

Further, the present disclosure encompasses a planar structure, wherein the plurality of subunits accommodate small seedlings of macrophyte plants in a manner such that the seedlings remain stable despite changing environmental conditions, that an appropriate separation exists between each subunit of the plurality of subunits and for avoiding undue impediment, thereby for facilitating root-growth, that the plurality of subunits cover a maximum surface area of the water for increasing filtration, and that any damaged plants or seedlings can be removed without undue interference from other plants and seedlings.

Furthermore, the purification apparatus can be assembled and disassembled without requiring any special tools or expertise, in accordance with the present disclosure. As such, the purification apparatus is installable anywhere in the world without requiring a large labor force, higher education, special training may, or special resources.

BRIEF DESCRIPTION OF THE DRAWING

The above, and other, aspects, features, and advantages of several embodiments of the present disclosure will be more apparent from the following Detailed Description as presented in conjunction with the following several figures of the Drawing.

Corresponding reference characters indicate corresponding components throughout the several figures of the Drawing. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiment are often not depicted in order to facilitate a less obstructed view of these various embodiments of the present disclosure.

DETAILED DESCRIPTION

The following description is not to be taken in a limiting sense, but is made merely for the purpose of describing the general principles of exemplary embodiments. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the several figures of the Drawing, the purification apparatus 100 is a generally planar structure, e.g., a mat, a laminae mat, floating surface lamina, or a microbial mat, provides an object-based technology that is implemented in an efficient manner and considers all of the variables affecting the purification apparatus' functionality, e.g., the generation and installation of floating surface laminae for the optimal treatment of bodies of water using living organisms, such as macrophyte plants, in accordance with the present disclosure.

In the preferred embodiment, the purification apparatus 100 comprises a polymer material, such as a low-density flexible polypropylene, and is manufacturable by way of injection molding technique, e.g., by a single injection cast, or by rapid prototyping, to integrally form a one-piece structure, the one-piece structure having the dimensional ranges and a variety of shapes as herein described. Understood is that, while the present invention provides such specifications for the benefit of full disclosure and best mode, any number of different shapes and sizes could be adopted, depending on a given living organism, such as a macrophyte or any other bioactive organism, wherein the size of the roots and the unique characteristics of the biological matter being applied to the surface of a fluid, such as water, aqueous solutions, aqueous mixtures, and other liquids, or other non-solid materials, such as sols or gels, are taken into consideration.

The purification apparatus 100 comprises a frame and a plurality of receiving structures 110, e.g., cups or baskets, into which a living organism, such as seedlings of macrophyte plants, is insertable. The plurality of receiving structures 110 are formed and distributed throughout the planar structure of the purification apparatus 100 in a manner that, not only optimizes growth of the living organism, such as the macrophyte, but also facilitates stacking of each purification apparatus 100, such as a mat, in relation to another purification apparatus 100 by providing registrability of one receiving structure or cup 110 in relation to another receiving structure or cup 110, thereby providing a snug fit thereby clipping together. This configuration is optimal for shipping, handling, and overall transportation of the purification apparatus 100. As such, transporting a plurality of the purification apparatuses 100 is possible at an accessible cost, being possible if the plurality of the purification apparatuses 100 are compliant with set standards, such as the European standard pallet plan-form (foot-print) size in a range of approximately 120 cm×approximately 80 cm, if the plurality of the purification apparatuses 100 are effectively stackable to facilitate the transport of the maximum number of units per unit of height, and if the plurality of the purification apparatuses 100 are light in weight. For water purification applications, the purification apparatus 100 comprises a material, such as a polymer, e.g., polypropylene, that is compatible with the biological environment, is non-contaminant, and is recyclable.

Figure 1A:
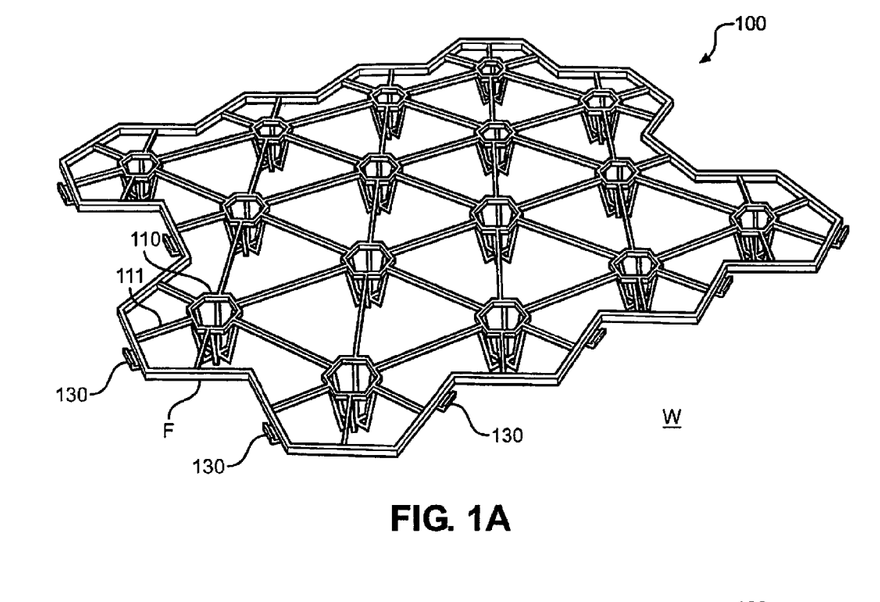
FIG. 1A is a diagram illustrating a top perspective view of a purification system, such as a modular flotation system, comprising at least one purification apparatus, each at least one purification apparatus being a planar structure and comprising a frame and a plurality of subunits, each subunit comprising a receiving structure, in accordance with an embodiment of the present disclosure.
Figure 1B:
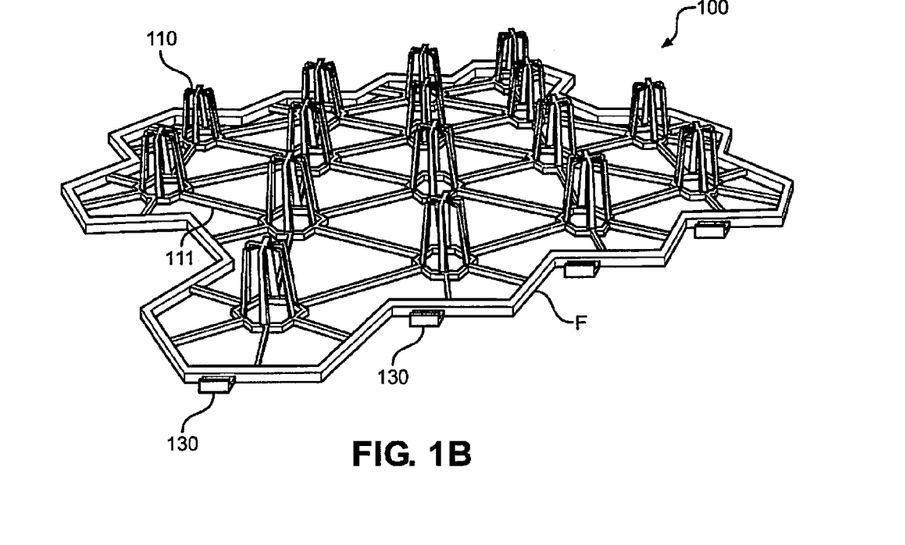
FIG. 1B is a diagram illustrating a bottom perspective view of a purification system, such as a modular flotation system, comprising at least one purification apparatus, each at least one purification apparatus being a planar structure and comprising a frame and a plurality of subunits, each subunit comprising a receiving structure, in accordance with an embodiment of the present disclosure.

Referring to FIGS. 1A and 1B, these diagrams respectively illustrate top and bottom views of a purification apparatus 100 that facilitates suspension of bioactive living organisms, such as macrophyte plants, over a fluid body W, such as: a liquid, water, aqueous solution, aqueous mixture, liquid solution, liquid mixture, sols, or gels for naturally purifying the fluid body, in accordance with the present disclosure. The purification apparatus 100 comprises a plurality of receiving structures 110, e.g., a cup or a basket, wherein each receiving structure 110 or plurality of receiving structures 110 is coupled with, e.g., integrally coupled with, at least one other receiving structure 110 by way of at least one connecting member 111, such as connectors and basket-like structures. In addition, each purification apparatus 100 further comprises at least one fastener 130, such as a bi-directional clip, laterally or peripherally disposed, wherein proper fastening thereof facilitates stackabilty as well as provides structural stability during transportation. While each receiving structure 110 is herein described with reference to its portions for clarity, understood is that, in a preferred embodiment, the purification apparatus 100 is formed as an integral one-piece structure, whereby additional assembly steps or the need for connectors, otherwise resulting in a structurally unstable configuration, is eliminated, and whereby the purification apparatus 100 provides has increased structural integrity.

Still referring to FIGS. 1A and 1B, the purification apparatus 100 can be optimally used to suspend a living organism, e.g., a bioactive organism, such as a macrophyte plant, on a fluid surface, such as a surface of water body (for example, a natural water body, such as fjords, portions of seas, portions of ocean, bays, lagoons, lakes, ponds, streams, creeks, rivers, or other natural waterways, or other pre-existing water body, such as artificially created water body, such as pools, reservoirs, flood controls), thereby providing a homogenous structure in the growth phase of the living organism. When the living organism reaches its natural size, e.g., through growth and intertwining of roots in the case of plants, the purification apparatus 100 provides an organism-based surface lamina which, when disposed in contact with dirty, contaminated, polluted fluids, e.g., dirty waters, or fluids otherwise in need of treatment, facilitates biological purification thereof. For example, large HAZMAT vats and HAZMAT reservoirs might benefit from this system. Many such vats and reservoirs are located in open space and "super-fund" sites in the U.S. As such, this system may be easily deployed to address other forms of pollution by using an appropriate bioactive organism for a given clean up.

Still referring to FIGS. 1A and 1B, the receiving structures 110 accommodate at least one living organism, such as a macrophyte plant, that will grow, thrive, and filter a fluid, such as water, by way of the living organism's structure, such as its roots in the case of plants, that grow distally through the bottom of the receiving structures 110. In the preferred embodiment, the receiving structure 110 comprises a bio-degradable material, such as biodegradable starch based plastics that are environmentally-friendly and provides at least one opening 112 and at least one frangible portion 113 such that the roots can expand through the at least one opening 112 and even rupture the at least one frangible portion 113 if needed for optimal growth (See also FIG. 2.).

Still referring to FIGS. 1A and 1B (See also FIG. 2.), in a preferred embodiment, the purification apparatus 100 comprises at least one support portion, the at least one connecting member 111 comprising a polymer material, e.g., a low-density flexible polypropylene, or an olefin polymer material, e.g., a low-density polyethylene (LDPE), the at least one connecting member 111 being formed by way of a single-injection molding technique as an integrally formed one-piece configuration. LDPE is a polymer from the family of the olefin polymers; and LDPE is a thermoplastic polymer comprising repetitive units of ethylene. These or other LDPEs are polymers having a structure of highly branched chains. These, or similar materials, such as: composite materials, coated or encapsulated Styrofoam, and the like; having a density below 1.00, e.g., in a preferred range of approximately 0.92 to approximately 0.94, provide the purification apparatus 100 with sufficient buoyancy in relation to the fluid, such as water, and are encompassed by the present disclosure.

Figure 4:
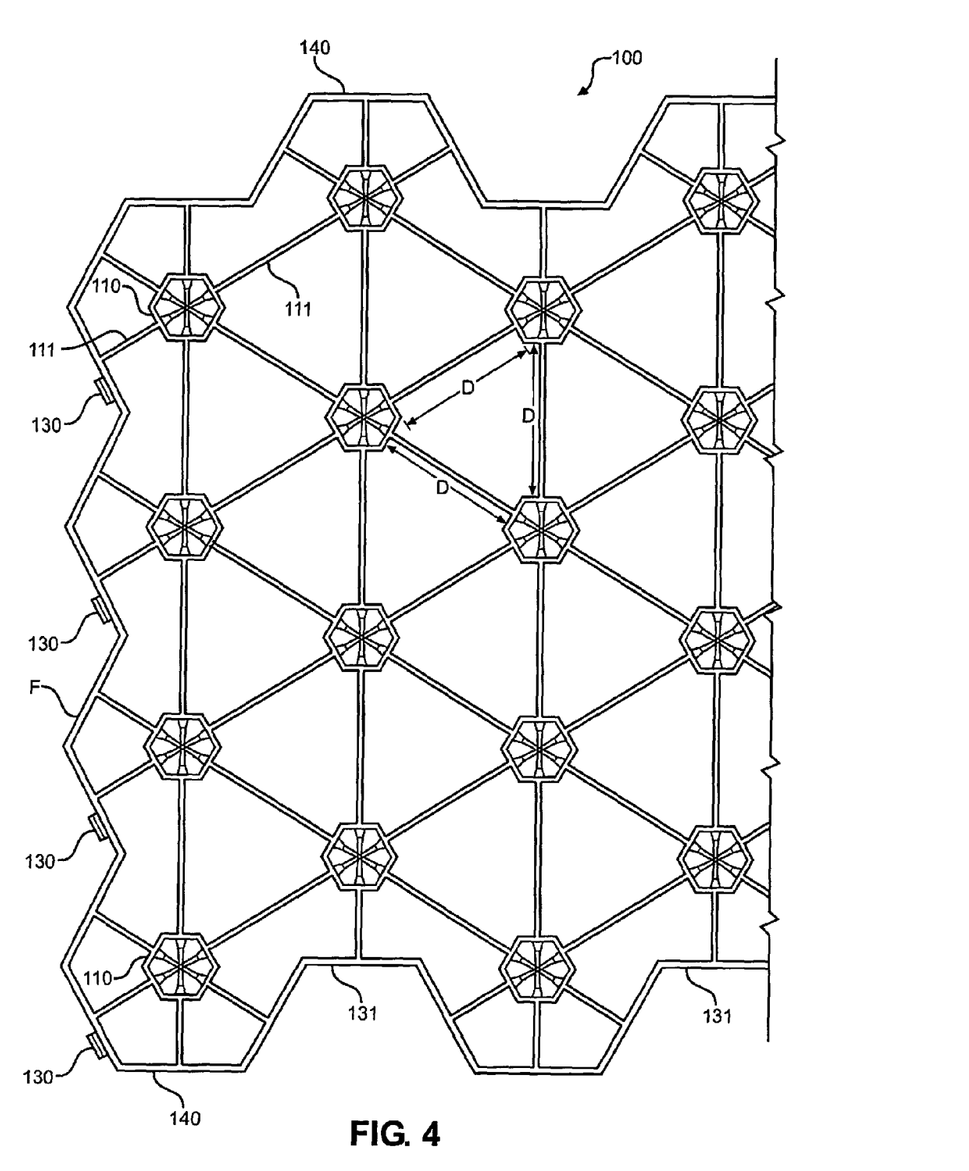
FIG. 4 is a diagram illustrating a detailed cut-away plan-form view of a purification apparatus, the purification apparatus being a planar structure and comprising a frame and a plurality of subunits, each subunit comprising a receiving structure, in accordance with an embodiment of the present disclosure.

Still referring to FIGS. 1A and 1B, the purification apparatus 100 comprises a spatial distribution D for the receiving structures 110, thereby providing a mathematically homogeneous mat, even independently of whether they are located at a periphery 140 of each purification apparatus 100 (See also FIG. 4.). In the illustrated embodiment and by example only, the spatial distribution D follows a triangular pattern, such as an equilateral triangle, thereby facilitating a plurality of planting densities to meet the requirements of each, and any, intervention. However, any polygonal configuration may be formed by the connecting members 111 to effect a homogeneous mat and is also encompassed by the present disclosure.

Still referring to FIGS. 1A and 1B, the purification apparatus 100 comprises at least one fastener 130; the at least one fastener 130 may facilitate unidirectional, simple, fast, solid, quick-connect and disconnect, reversible assembly, storage, and distribution. By providing the purification apparatus 100 with a single, integrated, and flexible structure that can be manufactured by injection molding with use of a single injector, the apparatus 100 can interlock to create a solid laminae that is resistant to wind, waves, or other perturbations, e.g., caused by wildlife or seismic activity (in all directions of the surface plane) and can be anchored at the edge or periphery 140 in a very simple manner by way of the at least one fastener 130, wherein the at least one fastener 130 is strategically disposed in a manner that facilitates and optimizes ease of connection, e.g., quick-connection and quick-disconnection, and minimizes any unusable space, e.g., space between any two purification apparatuses 100 is the purification system S of the present disclosure (See also FIG. 4).

Still referring to FIGS. 1A and 1B, in a preferred embodiment, each purification apparatus 100 comprises a frame F and a plurality of receiving structures 110, e.g., at least sixteen (16) receiving structures 110 for receiving living organisms, such as seedlings, wherein each receiving structure 110 of the plurality of receiving structures 110 comprises a peripheral shape, such as: a triangular, square, polygonal, circular, curved or any combination of such shapes wherein the plurality of receiving structures 110 are disposed in relation to the at least one connecting member 111 to form a network of triangular structures, and wherein each receiving structure 110 of the plurality of receiving structures 110 comprises a node for facilitating bioactivity. The purification apparatus 100 in this configuration further comprises a plurality of fasteners 130, e.g., four (4) fasteners 130, that are easily registrable, and insertable, in relation to corresponding recesses of any other purification apparatus 100, e.g., companion units. A purification system S comprises at least one purification apparatus 100 being fastened together by way of the at least one fastener 130 and corresponding recesses, thereby forming a solid and reinforced purification system S having high structural integrity, excellent buoyancy, and low weight.

Figures 2, 3A, 3B:
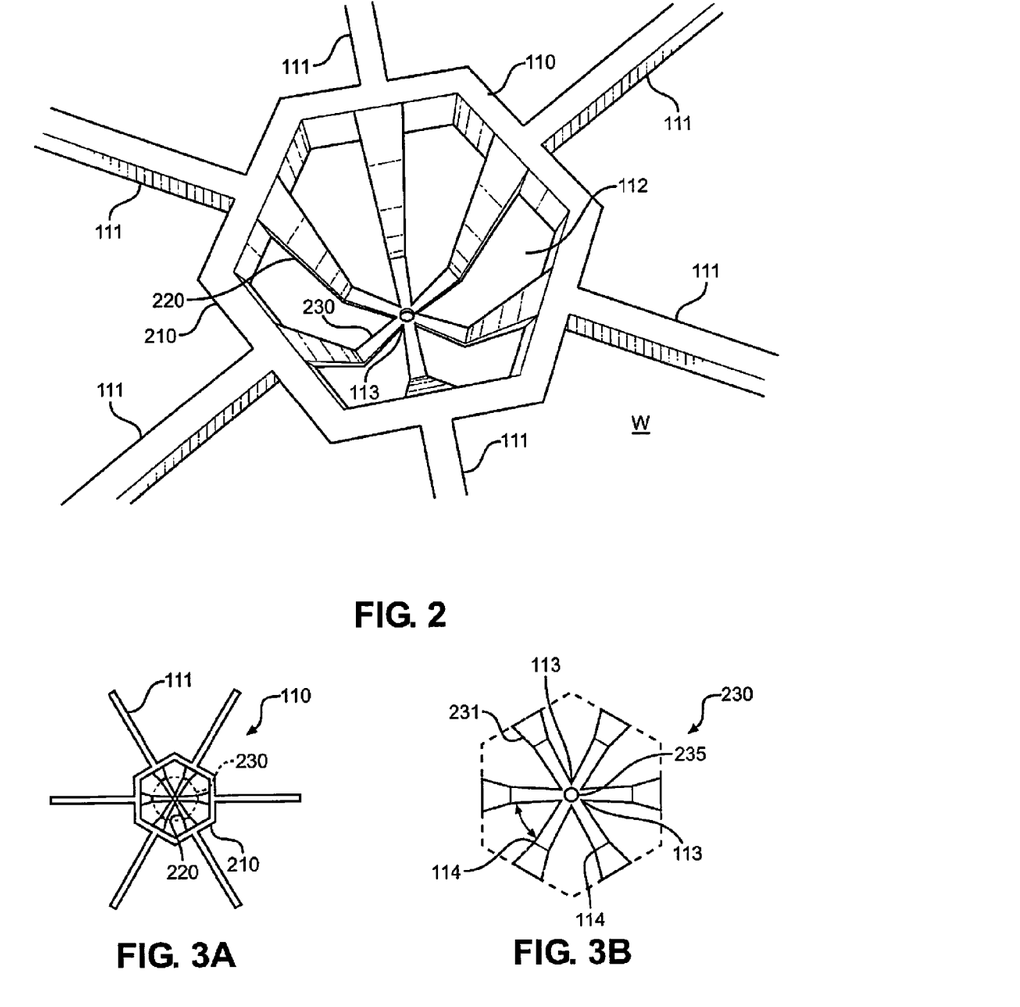
FIG. 2 is a diagram illustrating a detailed top perspective view of a subunit of the plurality of subunits, the subunit comprising a receiving structure, such as a receiving cup, in accordance with an embodiment of the present disclosure.
FIG. 3A is a schematic diagram illustrating a detailed top view of a subunit comprising a receiving structure, such as a receiving cup, with a detailed partial view of a lower support portion of the receiving structure, in accordance with an embodiment of the present disclosure.
FIG. 3B is a schematic diagram illustrating a cross-sectional view of a subunit comprising a receiving structure, such as a receiving cup, in accordance with an embodiment of the present disclosure.

Referring to FIG. 2, a detailed top perspective view illustrates one embodiment of a receiving structure 110, in accordance with the present disclosure. The receiving structure 110 may comprises at least three support portions, integrally formed, e.g., by single-injection molding. The at least three support portions may comprise an upper support portion 210, e.g., having a hexagonal shape, at least one median support portion 220 coupled with the upper support portion 210, e.g., being distributed and attached in relation to the perimeter of the upper support portion 210, and a lower support portion 230 comprising at least one radial member 231, wherein the major plane of the bottom support portion 230 is generally parallel to the major plane of the upper support portion 210.

Still referring to FIG. 2, the upper support portion 210 comprises a cross-section having at least one shape, such as: a triangular, square, polygonal, circular, curved or any combination of such shapes; and a cross-sectional area in a range of approximately 40 mm$^2$ to approximately 80 mm$^2$ in accordance with a preferred embodiment of the present disclosure.

Still referring to FIG. 2, the at least one median support portion 220 comprises a cross-section having at least one shape, such as: a triangular, square, polygonal, circular, curved or any combination of such shapes and a cross-sectional area in a range of approximately 32 mm$^2$ to approximately 64 mm$^2$, in accordance with a preferred embodiment of the present disclosure. Further, the at least one median support portion 220 is disposable or formable in a direction that is generally vertical or generally perpendicular in relation to the major plane of the upper support portion 210.

Still referring to FIG. 2, the lower support portion 230 comprises a cross-section having at least one shape, such as: a triangular, square, polygonal, circular, curved or any combination of such shapes; and a cross-sectional area in a range of approximately 25 mm$^2$ to approximately 50 mm$^2$' in accordance with a preferred embodiment of the present disclosure. Further, the lower support portion 230 is disposable or formable in a direction that is generally horizontal or generally perpendicular in relation to the major axis of the at least one median support portion 220 and in a direction that is generally parallel to the major plane of the upper support portion 210.

Referring to FIG. 3A, this schematic diagram illustrates a detailed top view of a subunit comprising a receiving structure 110, such as a receiving cup, in accordance with an embodiment of the present disclosure. In a preferred embodiment, the upper support portion 210 comprises an inner dimension in a range of approximately 40 mm to approximately 80 mm. The at least one median support portion 220 comprises a width in a range of approximately 4 mm to approximately 2.5 mm, wherein the at least one median support portion 220 comprises a taper, e.g., narrowing from top to bottom. Reiterating, the at least one median support portion 220, comprising a thicker width proximal to the upper support portion 210, provides reinforcement. Further, the at least one median support portion 220, comprising a narrow width proximal to the lower support portion 230, provides significant space for growth of the living organism, e.g., a macrophyte plant, by providing ample room for the development of the living organism, e.g., its roots.

Still referring to FIG. 3A, the lower support portion 230 further comprises an opening 235, e.g., a circular opening, having an inner dimension in a range of approximately 2.5 mm. The opening 235 is disposed at the center of the lower support portion 230. This configuration provides an angle $\theta$ in a range of approximately 53 degrees between each at least one radial member 231 of the lower support portion 230, whereby greater than approximately 87% of the lower support portion 230 is available for organism growth, such as root growth and root exposure. Additionally, by tapering the at least one median support portion 230 proximal to the lower support portion 230, at least one other frangible portion 114 is thereby formed at such coupling between each at least one median support portion 230 and the lower support portion 230, thereby providing less resistance and easier "breaking points" for the organism, e.g., the plant and roots in the event that the organism, e.g., the macrophyte plant, requires additional space.

Referring to FIG. 3B, this schematic diagram illustrates a vertical cross-section A-A of the receiving structure 110, in accordance with an embodiment of the present disclosure. The width of the at least one median support portion 220 that is proximal to the upper support portion 210 comprises a range of approximately 1.24 mm to approximately 2.48 mm. while the width of the at least one median support portion 220 that is proximal to the lower support portion 230 comprises a range of approximately 0.75 mm to approximately 1.5 mm. The receiving structure 110 comprises a depth in a range of approximately 62 mm to approximately 124 mm, e.g., extending from the top of the upper support portion 210 to the bottom of the lower support portion 230.

Figure 3C:
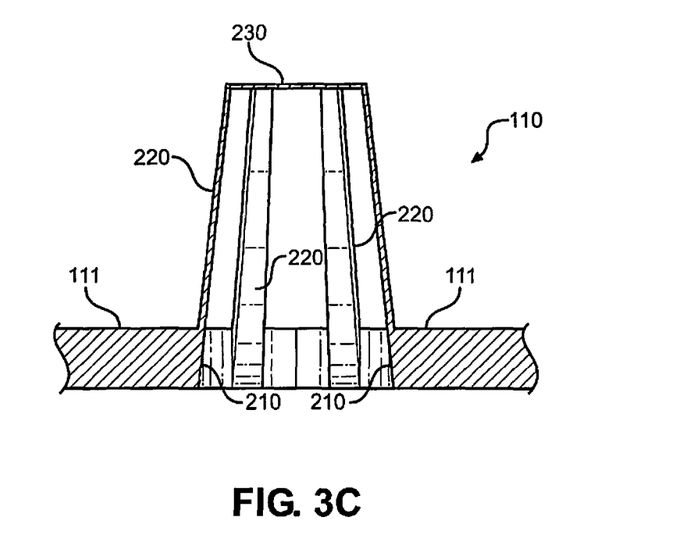
FIG. 3C is a schematic diagram illustrating a plurality of subunits, comprising two receiving structures, such as two receiving cups, being coupled together for facilitating stacking, in accordance with an embodiment of the present disclosure.
Figure 3D:
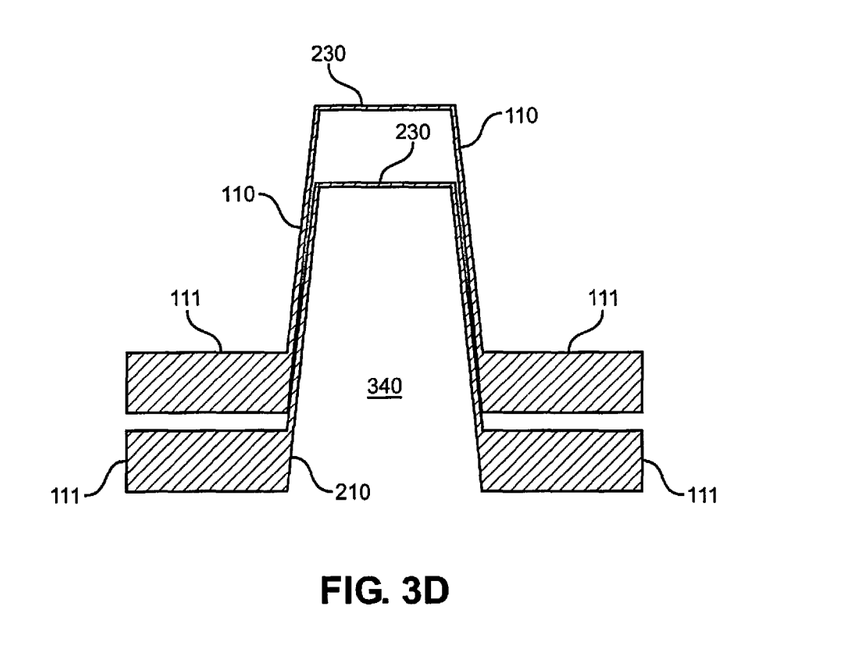
FIG. 3D is a schematic diagram illustrating a plurality of subunits, comprising two receiving structures, such as two receiving cups, being coupled together for facilitating stacking, in accordance with an embodiment of the present disclosure.

Referring to FIG. 3C, this schematic diagram illustrates two receiving structures 110, such as two receiving cups, being coupled together, or disposed in relation to one another, for facilitating stacking, in accordance with an embodiment of the present disclosure. The two receiving structures 110 are shown as coupled for storage or shipment. The combination of the thickness of the receiving structure 110 and the angle subtended by the median support portion 220 from the top at the upper support portion 210 to the lower support portion 230 provide an optimal and beneficial coupling, thereby forming a spacing 340 in a range of approximately 0.4 mm to approximately 0.8 mm. The spacing 340 provides at least the following benefits: space saving when stacking together purification apparatuses 100 and sufficient tolerance between the receiving structures 110 for facilitating separation of the purification apparatuses 100 for deployment at the water site.

Referring to FIG. 4, this diagram illustrates a detailed cut-away plan-form view of a purification apparatus 100, comprising a frame F and a plurality of receiving structures 110, such as a receiving cup, in accordance with an embodiment of the present disclosure. By example only, the dimensions of a single receiving structure 110 are shown in FIG. 4. The single receiving structure 110 is disposed at a periphery of the purification apparatus 100 and is designated as an "edge unit," wherein the single receiving structure 110 is coupled with at least one connecting member 111, and wherein each at least one connecting member 111 may comprise a distinct dimension or different dimensions, e.g., a distinct length or different lengths. For example, the edge unit is coupled with a plurality of connecting members 111, wherein at least two support connecting member 111 of the plurality of connecting members 111 comprise a length that is distinct from the remaining connecting members 111. Accordingly, the at least two support members 111 (subunit disposed outboard) comprise a length in a range of approximately 50 mm to approximately 100 mm; and the remaining connecting members 111 (subunit disposed inboard) comprise a length in a range of approximately 112 mm to approximately 224 mm, by example only.

Still referring to FIG. 4, the purification apparatus 100 further comprises at least one fastener 130 that is easily registrable, and insertable, in relation to corresponding recesses 131 of any other purification apparatus 100, e.g., companion units. A purification system S comprises at least one purification apparatus 100 being fastened together by way of the at least one fastener 130 and corresponding recesses, thereby forming a solid and reinforced purification system S having high structural integrity, excellent buoyancy, and low weight. The frame F comprises any number of polygonal or curvilinear configurations. By example only, at least two configurations of the frame F are encompassed by the present disclosure.

Still referring to FIG. 4 and referring back to FIGS. 1A and 1B, the first configuration involves a given set of edges of the frame F being provided with at least one fastener 130 while the remaining set of edges are provided with at least one recess 131, wherein the at least one fastener 130 of a frame F of one purification apparatus 100 can be correspondingly coupled with the at least one recess 131 of a frame F of another purification apparatus 100, thereby facilitating coupling of one purification apparatus 100 to another purification apparatus 100 during deployment to form the purification system S. In addition, the frame F comprises at least one set of edges having a shape being correspondingly complementary to the remaining set of edges such that a plurality of purification apparatuses 100 may be interlockingly, yet removably, disposed in relation to one another to form the purification system S.

Still referring to FIG. 4, in a second configuration, the frame F is provided with at least one fastener 130 along a set of opposing edges while the remaining set of opposing edges are provided with at least one recess 131, wherein the at least one fastener 130 of a frame F of one purification apparatus 100 can be correspondingly coupled with the at least one recess 131 of a frame F of another purification apparatus 100, thereby facilitating coupling of one purification apparatus 100 to another purification apparatus 100, e.g., during deployment to form the purification system S. In addition, the frame F, in this embodiment, comprises at least one set of edges having a shape being correspondingly complementary to the remaining set of edges such that a plurality of purification apparatuses 100 may be interlockingly, yet removably, disposed in relation to one another to form the purification system S.

Still referring to FIG. 4, in the second configuration, some "edge units" are coupled to the frame F by a single connecting member 111 and other "edge units" are coupled to the frame F by three connecting members 111. These complementary "edge units" couple with one another in a manner such that the top surface of one purification apparatus 100 couples with the bottom surface of another purification apparatus 100. As discussed in relation to FIG. 3C, this second configuration facilitates use of all space, eliminates undue gaps or spaces that would otherwise lead to unusable receiving structures 110.

Figure 5A:
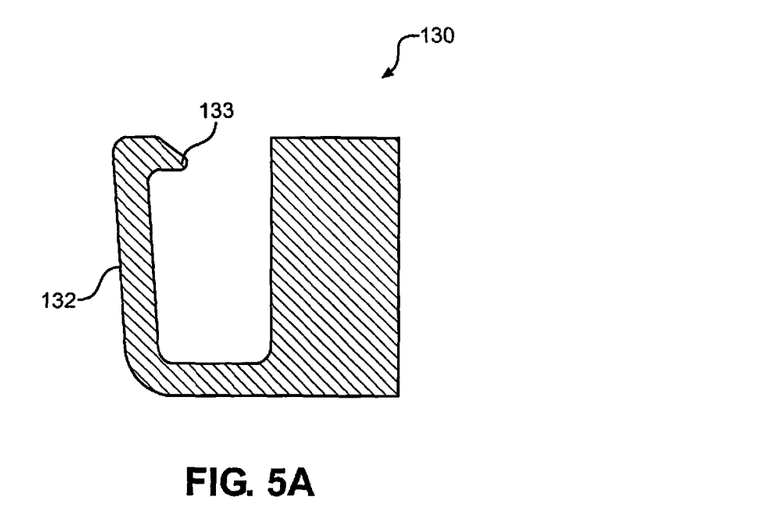
FIG. 5A is a diagram illustrating a cross-sectional view of a fastener, such as a clip having a latch portion, for facilitating coupling of a plurality of purification apparatuses, in accordance with an embodiment of the present disclosure.
Figure 5B:
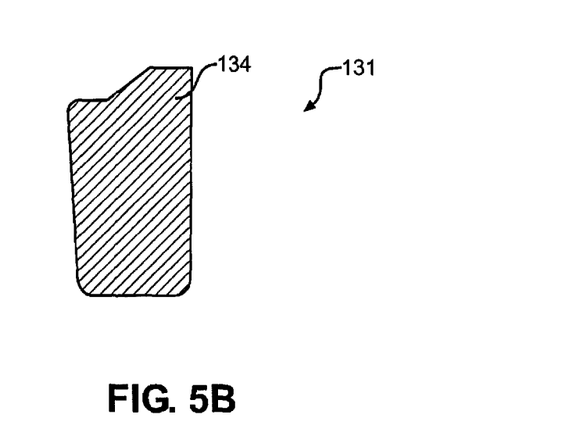
FIG. 5B is a diagram illustrating a cross-sectional view of a recess of a frame, for facilitating coupling of a plurality of purification apparatuses, in accordance with an embodiment of the present disclosure.

Referring to FIGS. 5A and 5B, FIG. 5A illustrates a cross-sectional view of a fastener 130, such as a clip, having a latch portion 132; and FIG. 5B illustrates a cross-sectional view of a recess 131, wherein the fastener 130 is disposable in the recess 131 for coupling together a plurality of purification apparatuses 100 for forming the purification system S, in accordance with an embodiment of the present disclosure. For example, the fastener 130 comprises a clip having a latch portion 132. The latch portion 132 includes a tongue portion 133 (of one purification apparatus 100) that couples with a corresponding tongue recess 134 of the recess 131 (of another purification apparatus 100). The fasteners 130 comprise rounded edges for facilitating coupling the purification apparatuses 100 without undue engineering or difficulty.

Figure 6A:
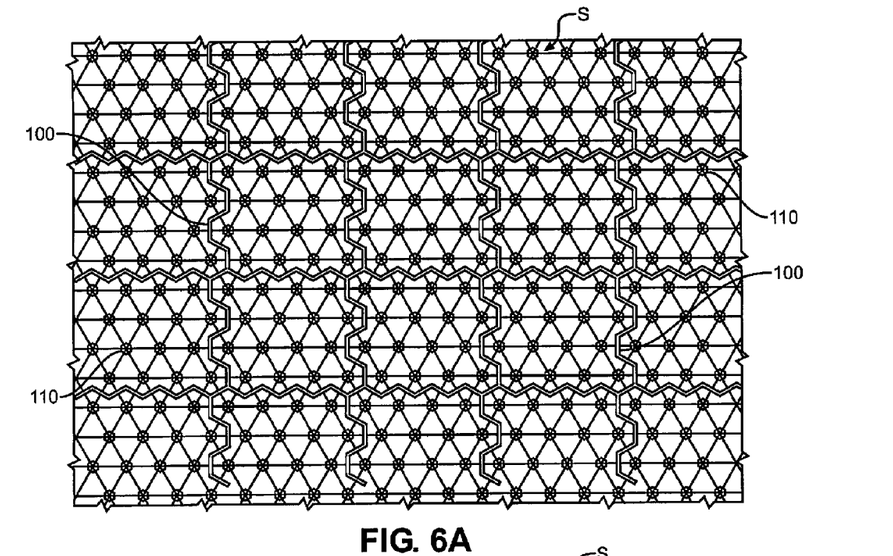
FIG. 6A is a diagram illustrating a plan-form view of a purification system, such as a modular flotation system, comprising a plurality of purification apparatuses, each purification apparatus being a planar structure and comprising a frame and a plurality of subunits, each subunit comprising a receiving structure, in accordance with an embodiment of the present disclosure.

Referring to FIG. 6A, this diagram illustrates a plan-form view of a purification system S, such as a modular flotation system, comprising at least one purification apparatus 100, being a generally planar structure, the at least one purification apparatus 100 comprising a frame F and a plurality of subunits, each subunit comprising a receiving structure 110, in accordance with an embodiment of the present disclosure. As shown, the purification system S comprises a plurality of purification apparatuses 100 coupled together in this embodiment. The geometry of the frame F of each purification apparatus 100 provides a powerful, yet facile, approach to forming a purification system S that accommodates not only large fluid, e.g., water, bodies, but also provides the ability to dynamically cover any shape or type of fluid body W, e.g., water, body.

Figure 6B:
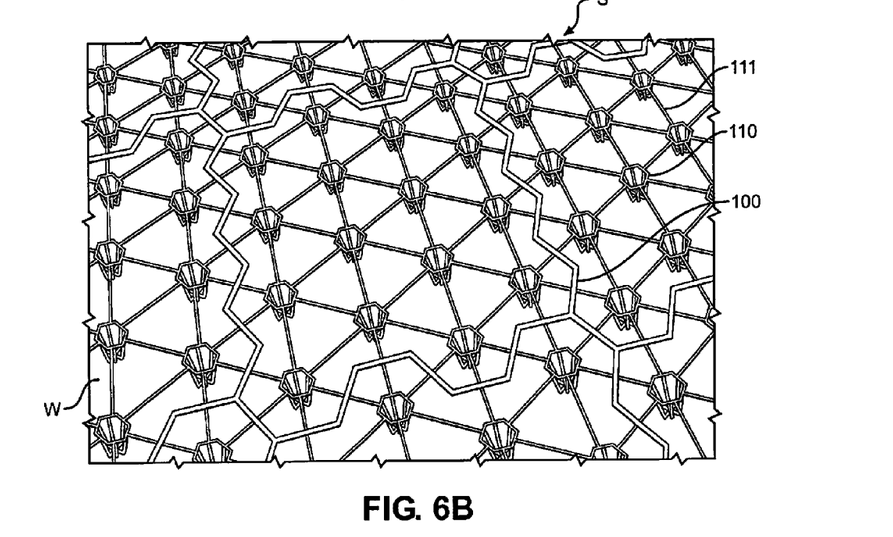
FIG. 6B is a diagram illustrating a top perspective view of a purification system, such as a modular flotation system, comprising a plurality of purification apparatuses, each at least one purification apparatus being a planar structure and comprising a frame and a plurality of subunits, each subunit comprising a receiving structure, in accordance with an embodiment of the present disclosure.

Referring to FIG. 6B, this a diagram illustrates a perspective view of a purification system S, such as a modular flotation system, comprising at least one purification apparatus 100, being a generally planar structure, the at least one purification apparatus 100 comprising a frame F and a plurality of subunits, each subunit comprising a receiving structure 110, in accordance with an embodiment of the present disclosure. As shown, the purification system S comprises a plurality of purification apparatuses 100 coupled together in this embodiment. The geometry of the frame F of each purification apparatus 100 provides a powerful, yet facile, approach to forming a purification system S that accommodates not only large fluid, e.g., water, bodies, but also provides the ability to dynamically cover any shape or type of fluid body W, e.g., water, body. This perspective view of the purification system S shows that manner in which the purification system S floats on the surface of a fluid body.

Noteworthy is that, although several preferred embodiments of this invention have been described in detail herein with reference to the accompanying drawings, it is understood that the invention is not limited to these precise embodiments, and that various changes and modifications may be effected therein by one skilled in the art without departing from the scope of spirit of the invention as defined in the appended claims. For example, although the receiving structure 110 is shown with specific measurements and dynamics, many different configurations are contemplated that could involve similar angles and benefits without fundamentally altering the benefits and advantages of the present disclosure.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the present disclosure.

What is claimed is:

1. A purification apparatus, comprising:
   a frame comprised of a plurality of thin connecting members with predominantly empty space between them forming one continuous solid piece that floats;
   a plurality of receiving structures within said frame wherein said receiving structures are capable of receiving living organisms; wherein said plurality of receiving structures comprise at least one opening and are capable of stacking inside the receiving structures of another similarly structured purification apparatus; wherein said receiving structures comprises at least three support portions formed of thin connecting members: a flat geometrically shaped upper support portion, at least one median support portion coupled with the upper support portion, and a lower support portion comprising at least one radial member, wherein the major plane of the bottom support portion is generally parallel to the major plane of the upper support portion; and
   a fastener capable of connecting one purification apparatus to another structurally similar purification apparatus.

2. The purification apparatus of claim 1, wherein said median support portion has a thicker width proximal to the upper support portion and a narrower width proximal to the lower support portion.

3. The purification apparatus of claim 1, wherein said receiving structures further comprise at least one frangible portion.

4. The purification apparatus of claim 1, wherein said receiving structures have an opening with a cross-sectional area in a range between 40 $mm^2$ and 80 $mm^2$.

5. The purification apparatus of claim 1, wherein said plurality of receiving structures are distributed equidistant from each other throughout said frame by said plurality of thin connecting members with predominantly empty space between them.

6. The purification apparatus of claim 1, further comprising a recess capable of being connected to by a pressure fit snap fastener of another structurally similar purification apparatus.

7. The purification apparatus of claim 1, wherein said frame consists of a non-toxic, bio-degradable, and recyclable material.

8. The purification apparatus of claim 1, further comprising:
   macrophyte plants;
   wherein said macrophyte plants are inserted into said receiving structures.

9. The purification apparatus of claim 1, wherein said receiving structures have either hexagonal or triangular openings and are supported by said thin connecting members at the center of each flat surface of the periphery of the thin connecting members forming said upper support portion; wherein said at least one median support portion and said radial members are also thin connecting members extending downward from the center of each of said flat surfaces of the periphery of said upper support portion; with predominantly empty space between all the thin connecting members forming the entire receiving structures.

10. The purification apparatus of claim 9, wherein the edges of said apparatus are comprised of jagged angles that are capable of being connected to by a pressure fit snap fastener of another structurally similar purification apparatus such that said jagged angles connect seamlessly and the internal geometrical patterns created by the thin connecting members are uninterrupted except by the jagged edges themselves.

* * * * *